(12) United States Patent
Kuo et al.

(10) Patent No.: US 7,251,399 B2
(45) Date of Patent: Jul. 31, 2007

(54) METHOD OF MAKING DENSELY PACKED LIGHT GUIDE RIBBON

(75) Inventors: Huei Pei Kuo, Palo Alto, CA (US); Albert H. Jeans, Palo Alto, CA (US); Steven L. Naberhuis, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 121 days.

(21) Appl. No.: 11/082,440

(22) Filed: Mar. 17, 2005

(65) Prior Publication Data

US 2006/0210226 A1    Sep. 21, 2006

(51) Int. Cl.
G02B 6/04 (2006.01)
G02B 6/44 (2006.01)

(52) U.S. Cl. ...................... 385/114; 115/121
(58) Field of Classification Search ................ 385/114; 65/385
See application file for complete search history.

(56) References Cited

U.S. PATENT DOCUMENTS

| 3,247,756 | A | * | 4/1966 | Siegmund ............... 385/120 |
| 4,758,064 | A | * | 7/1988 | Neefe .................... 385/100 |
| 4,929,048 | A |   | 5/1990 | Cuypers |
| 5,006,201 | A | * | 4/1991 | Kaukeinen ............. 216/24 |
| 5,943,463 | A | * | 8/1999 | Unuma et al. .......... 385/119 |
| 6,853,783 | B2 |  | 2/2005 | Chiasson et al. |
| 7,024,082 | B2 | * | 4/2006 | Kerr et al. ............. 385/114 |

* cited by examiner

*Primary Examiner*—Michelle Connelly-Cushwa
*Assistant Examiner*—Chris Chu (57) ABSTRACT

Provided is a method of making a densely packed light guide ribbon. More specifically, in at least one embodiment, a first clad layer is deposited upon a carrier. A first plurality of spaced light guides are then provided upon the first clad layer. A second clad layer is then deposited upon the first plurality of spaced light guides. A second plurality of light guides is then provided between the first plurality of light guides. A third clad layer is then deposited upon the second plurality of light guides to form the densely packed light guide ribbon.

25 Claims, 6 Drawing Sheets

METHOD OF MAKING DENSELY PACKED LIGHT GUIDE RIBBON

RELATED APPLICATIONS

This application is related to commonly owned U.S. patent application Ser. No. 10/698,829, filed on Oct. 31, 2003 by inventors Huei Pei Kuo, Lawrence M. Hubby, Jr. and Steven L. Naberhuis and entitled "Light Guide Apparatus For Use In Rear Projection Display Environments", herein incorporated by reference.

FIELD

This invention relates generally to the field of display devices, and more particularly to screens and related hardware employed in rear projection display devices.

BACKGROUND

Socially and professionally, most people rely upon video displays in one form or another for at least a portion of their work and/or recreation. With a growing demand for large screens, such as high definition television (HDTV), cathode ray tubes (CRTs) have largely given way to displays composed of liquid crystal devices (LCDs), plasma display panels (PDPs) or front or rear projection systems.

A CRT operates by scanning electron beam(s) that excite phosphor materials on the back side of a transparent screen, wherein the intensity of each pixel is commonly tied to the intensity of the electron beam. With a PDP, each pixel is an individual light-emitting device capable of generating its own light. With an LCD, each pixel is a back-lit, light modulating liquid crystal device.

As neither system utilizes a large tube, LCD and PDP screens may be quite thin and often are lighter than comparable CRT displays. However, the manufacturing process for LCDs, PDPs, and most other flat panel displays is much more complex and intensive with respect to both equipment and materials than that of CRTs, typically resulting in higher selling prices.

Projection systems offer alternatives to PDP and LCD based systems. In many cases, projection display systems are less expensive than comparably sized PDP or LCD display systems. Rear projection display systems typically employ a wide angle projection lens (or multiple lenses), operating in connection with one or more reflective surfaces to direct light received from the projector through the lens(es) to the back of a screen. The lens and mirror arrangement typically enlarges the image as well.

To accommodate the projector, one or more lenses, and reflectors, rear projection displays are typically 18 to 20 inches deep and not suitable for on-wall mounting. A typical rear projection system offering a 55-inch HDTV screen may weigh less than a comparable CRT, but at 200+ pounds it may still be difficult and awkward to install and support.

Often, rear projection display devices exhibit average or below average picture quality in certain environments. For example, rear projection displays may be difficult to see when viewed from particular angles within a room setting or when light varies within the environment. Aside from a theatrical setting, light output and contrast is a constant issue in most settings and viewing environments.

Despite advancements in projectors and enhanced lens elements, the lens and reflector design remains generally unchanged and tends to be a limiting factor in both picture quality and overall display system thickness.

A developing variation of rear projection displays utilizes light guides, such as optical fibers, to route an image from an input location to an output location and to magnify the image. Such displays may be referred to as light guide screens (LGSs). However, in certain configurations, light guide screens may lose a percentage of light and, thus, the brightness of the image.

In many cases, the light guide elements occupy a fraction of the area of the input surface and significant fraction of the input surface is occupied with clad or filler material. Thus only a fraction of the light from the projection source is coupled into the lightguide, causing a loss of image brightness.

Weight, thickness, durability, cost, aesthetic appearance and quality are key considerations for rear projection display systems and display screens. From the manufacturing point of view, cost of production and increased yield are also important.

Hence, there is a need for a rear projection display that overcomes one or more of the drawbacks identified above.

SUMMARY

This invention provides a densely packed light guide ribbon as may be used in a light guide screen display.

In particular, and by way of example only, according to an embodiment of the present invention, provided is a method of making densely packed light guide ribbons for a light guide screen, including: depositing a first clad layer upon a carrier; providing a first plurality of spaced light guides upon the first clad layer; depositing a second clad layer upon the first plurality of spaced light guides; providing a second plurality of light guides between the first plurality of spaced light guides; and depositing a third clad layer upon the second plurality of light guides to form a densely packed light guide ribbon.

DETAILED DESCRIPTION

Before proceeding with the detailed description, it is to be appreciated that the present teaching is by way of example, not by limitation. The concepts herein are not limited to use or application with a specific densely packed light guide ribbon or method of making such a densely packed light guide ribbon. Thus, although the instrumentalities described herein are for the convenience of explanation, shown and described with respect to exemplary embodiments, it will be appreciated that the principles herein may be equally applied in other types of light guide ribbons and/or light guide screen display systems.

Figure 9:
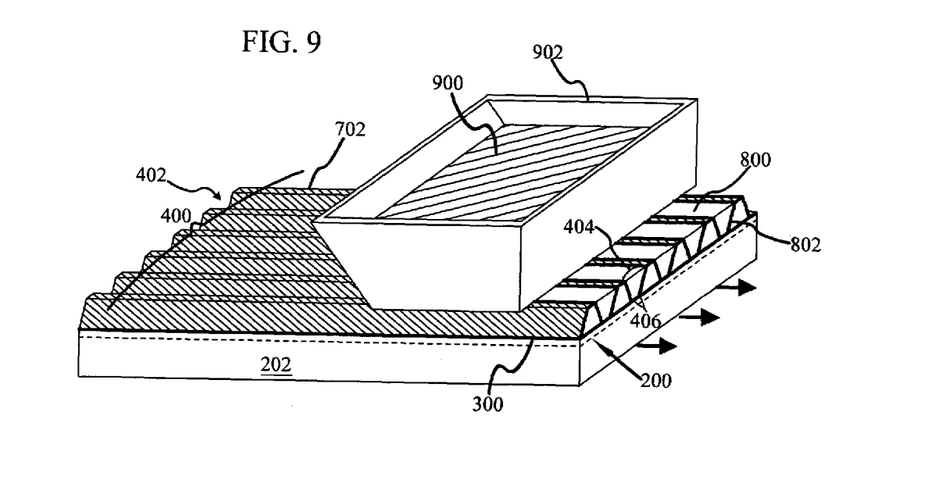
FIG. 9 illustrates a method of filling the grooves between the first plurality of light guides to provide the second plurality of light guides, according to an embodiment.
Figure 10:
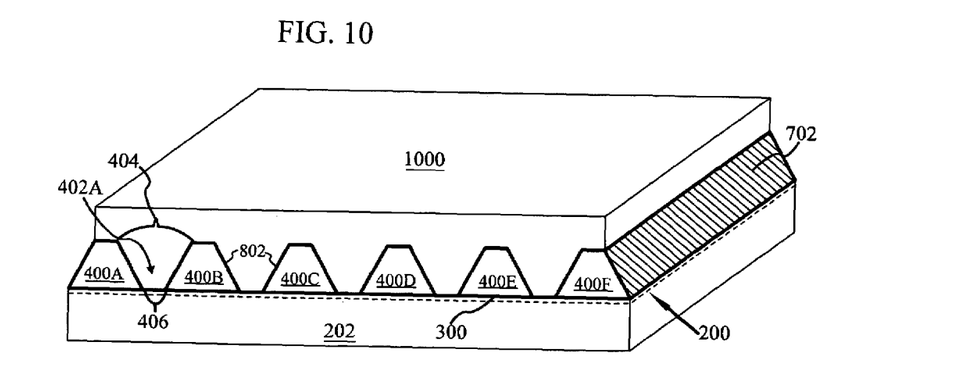
FIG. 10 illustrates an alternative method of providing the second plurality of light guides by providing an over-thick layer that is subsequently planarized, according to an embodiment.
Figure 11:
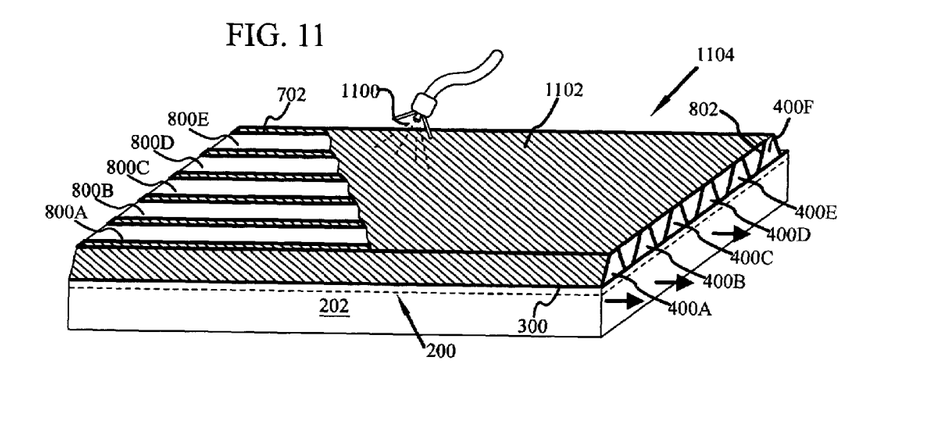
FIG. 11 illustrates the deposition of the third clad layer upon the second plurality of light guides to provide the densely packed light guide ribbon, according to an embodiment.
Figure 12:
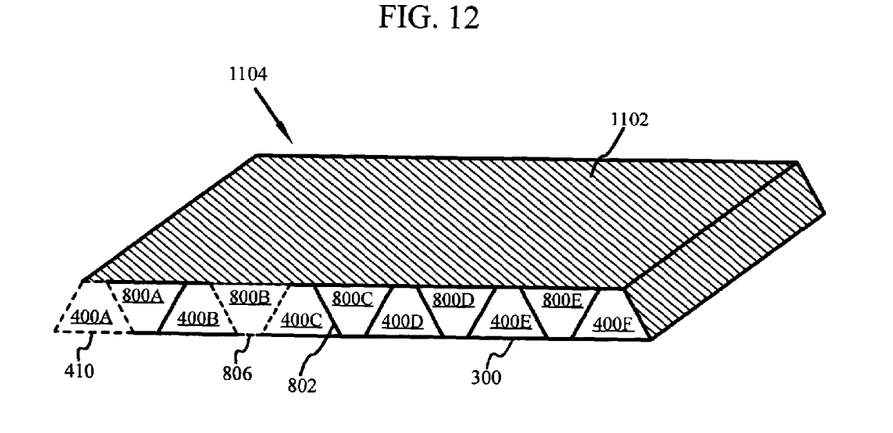
FIG. 12 illustrates the fabricated densely packed light guide removed from the carrier.

Referring now to the drawings, FIG. 1 through FIG. 12 conceptually illustrate at least one embodiment of a method of making a densely packed light guide ribbon 1104, illustrated in FIGS. 11 and 12. It will be appreciated that the described process need not be performed in the order in which it is herein described, but that this description is merely exemplary of one preferred method of performing the fabrication of a densely packed light guide ribbon. In addition, it is understood and appreciated that the scale of the components and features illustrated in the Figures has been exaggerated to facilitate ease of discussion and illustration.

With respect to the following description, it is understood and appreciated that each light guide has a longitudinal light guide core and an external circumferential cladding. The cladding is a material having a refraction index lower than that of the core.

Figure 1:
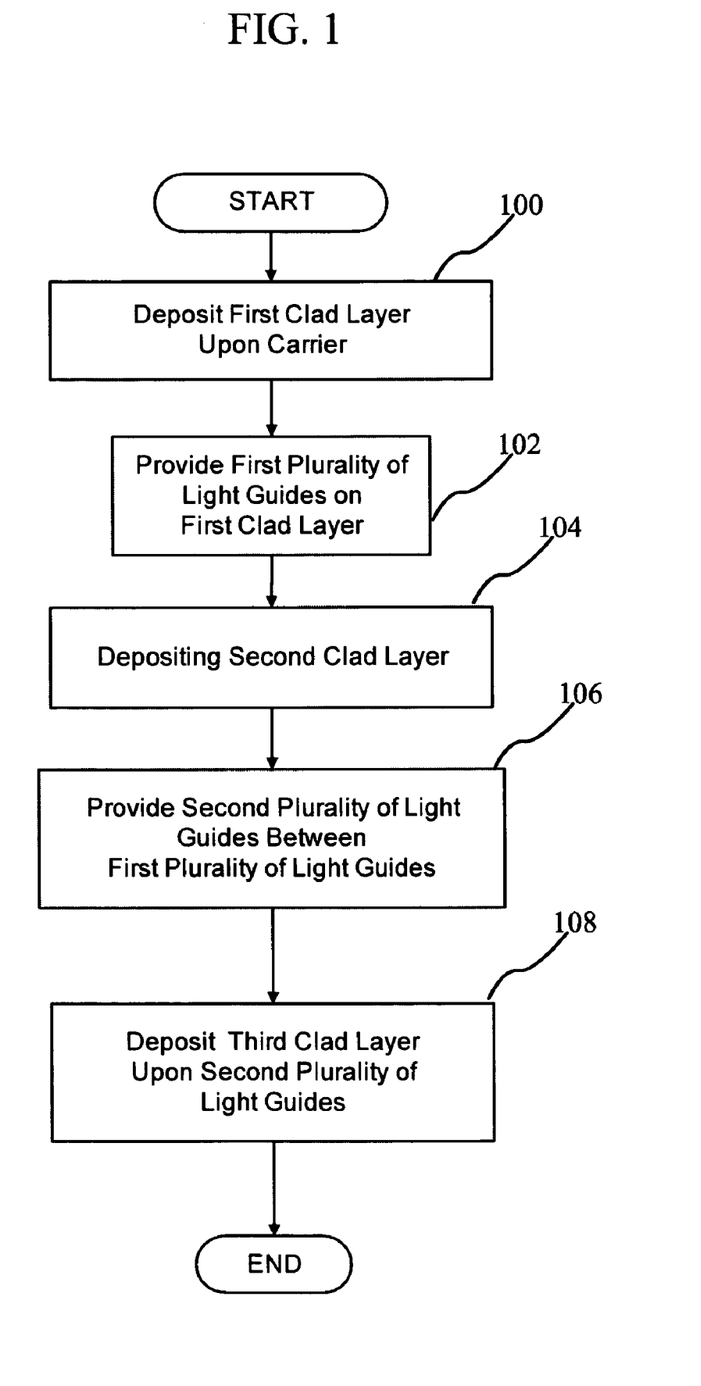
FIG. 1 is a high level flow diagram of a method of fabricating a densely packed light guide ribbon according to an embodiment.

FIG. 1 provides a high-level overview of the fabrication process to provide a densely packed light guide ribbon 1104 as shown in FIGS. 11 and 12. In at least one embodiment, the fabrication process may be summarized as follows. A first clad layer is deposited upon a carrier, block 100. A first plurality of spaced light guides are provided upon the first clad layer, block 102. Next, a second clad layer is applied upon the first plurality of spaced light guides, block 104. A second plurality of light guides are then provided between the first plurality of spaced light guides, block 106. A third clad layer is then deposited upon the second plurality of light guides to form a densely packed light guide ribbon 1104, block 108.

Figure 2:
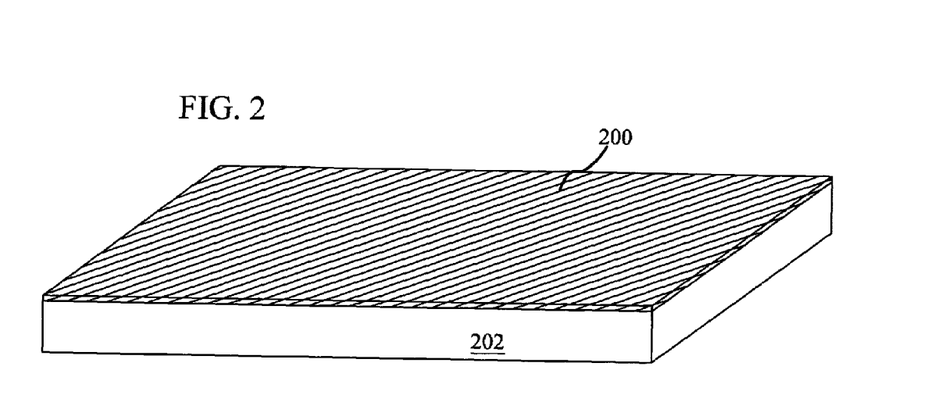
FIG. 2 illustrates a carrier with an optional release layer provided in the fabrication of a densely packed light guide ribbon, according to an embodiment.

As shown in FIG. 2, in at least one embodiment, the fabrication process commences with an optional release film, also known as a release layer 200, being applied to a carrier 202. Carrier 202 may be, but is not limited to, a production belt, a glass, a plastic or a metal substrate. Carrier 202 may also be transparent.

In at least one embodiment, optional release layer 200 is a thin film of stable and inert material, such as polytetrafluoroethylene also referred to as PTFE (Teflon™), or modified PTFE. PTFE molecules are so inert and stable that little else will react with and stick to it. A modified PTFE or similar release material, for example, allows enough adhesion for subsequent processing to be done in a dimensionally stable fashion.

In an alternative embodiment, optional release layer 200 is a thermal release layer 200. In yet another alternative embodiment, optional release layer 200 includes a layer of adhesive having a low tensile strength. Release layer 200 may be applied to carrier 202 using a lamination process, or through other processes such as, for example, a spraying or dipping process. As release layer 200 is an optional component, it is hereafter identified in the figures as a dotted line.

Figure 3:
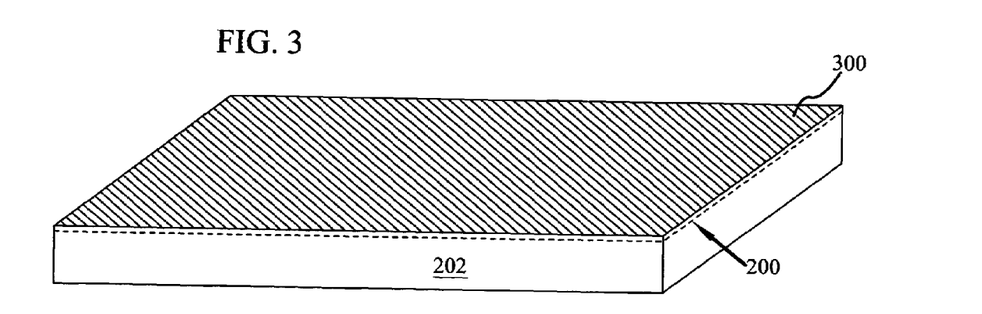
FIG. 3 illustrates a first clad layer applied to the carrier shown in FIG. 2, according to an embodiment.

In an embodiment where optional release layer 200 is not used, a first clad layer 300 is deposited upon carrier 202, as shown in FIG. 3. Where optional release layer 200 is used, first clad layer 300 is deposited upon release layer 200, opposite from carrier 202. First clad layer 300 consists of material with a selected index of refraction. In at least one embodiment, first clad layer 300 material is a fluorinated polymer or silicone. First clad layer 300 may be deposited by spraying, dipping or other appropriate methods so as to provide a uniformly thick first clad layer 300. More specifically, the uniform thickness of the first clad layer 300 is between about one and ten microns. In at least one embodiment, the thickness of first clad layer 300 is about four microns.

Figure 4:
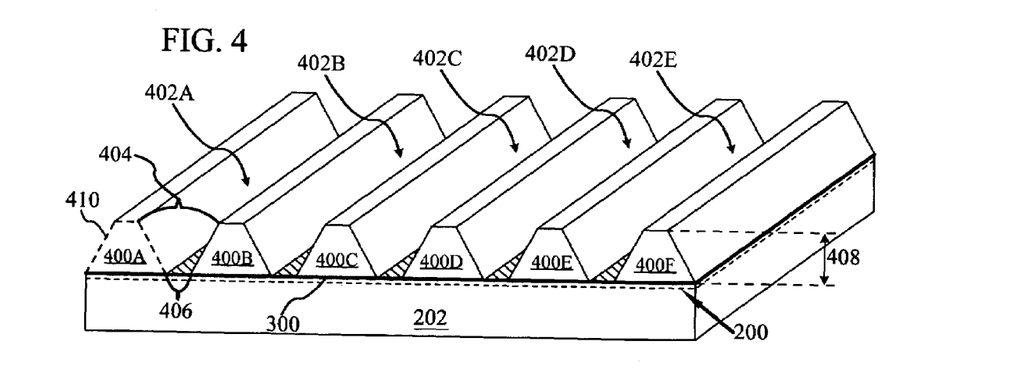
FIG. 4 illustrates a first plurality of light guides deposited upon the first clad layer shown in FIG. 3 and separated by grooves, according to an embodiment.

A first plurality of spaced light guides 400 is then provided upon first clad layer 300, shown in FIG. 4 as light guides 400A~F. As illustrated, in at least one embodiment, the first plurality of spaced light guides 400A~F are separated by grooves 402A~E, each having a top 404 and a bottom 406. As illustrated, in at least one embodiment, bottom 406 is narrower than top 404.

Moreover, each light guide 400 has a first geometry, illustrated as dotted line 410. As illustrated, in at least one embodiment, the first geometry 410 is isosceles trapezoid. Further, in at least one embodiment, the first plurality of spaced light guides 400 are uniformly spaced. In other words, the grooves 402 between each light guide 400 are substantially identical. The first plurality of light guides 400 establish a layer with a thickness defined substantially by the height 408 of each light guide 400. The height 408 of each light guide 400 is typically a matter of fabrication preference. Typically the height 408, and therefore the thickness of the established layer, is between about fifty and one-hundred microns.

Figure 5:
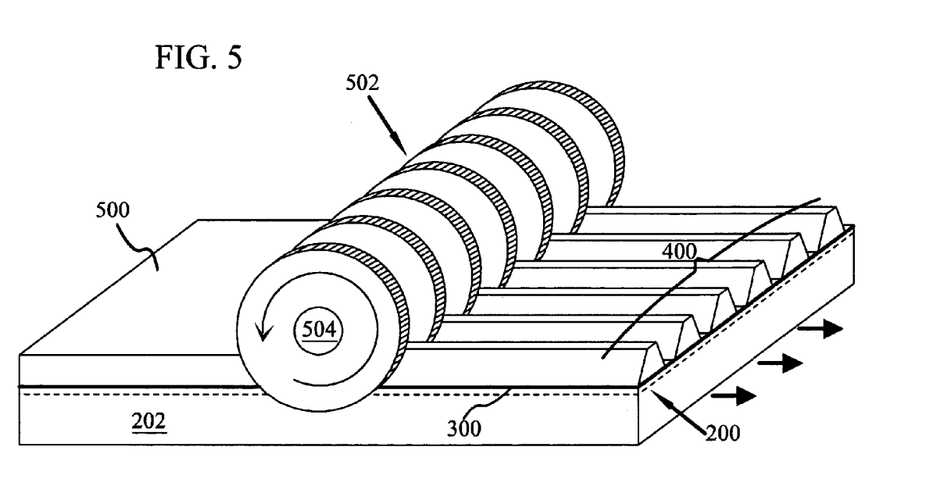
FIG. 5 illustrates an embossing method of providing the first plurality of light guides shown in FIG. 4, according to an embodiment.
Figure 6:
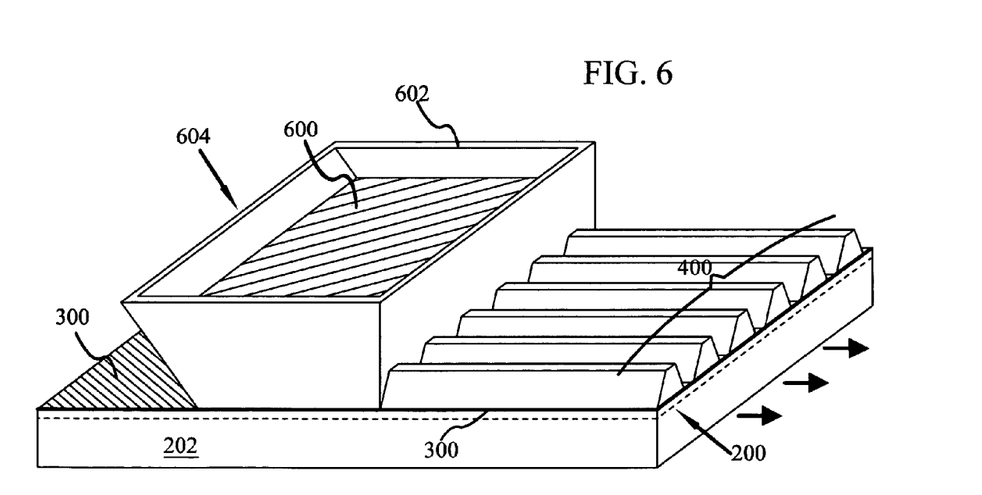
FIG. 6 illustrates an extrusion method of providing the first plurality of light guides shown in FIG. 4, according to an alternative embodiment.

The first plurality of light guides 400 may be provided by different fabrication methods such as, but not limited to, extrusion, embossing, offset printing, ink-jetting or the like. FIGS. 5 and 6 illustrate at least two alternative methods for providing a first plurality of light guides 400.

FIG. 5 conceptually illustrates an embossing process. Different embossing techniques are known and may be employed at the discretion of the technician as is suitable for establishing the first plurality of light guides 400. More specifically, in at least one embodiment, light guide material 500 is deposited upon first clad layer 300, (now illustrated as a thick line). As shown, in at least one embodiment, light guide material 500 is provided as a uniform layer. Further, the embosser 502 utilizes a rolling embossing drum 504. As light guide material 500 passes the embossing drum 504, it is transformed from the uniform layer into the first plurality of light guides 400.

FIG. 6 conceptually illustrates an extrusion process. Different extrusion process techniques are known and may be employed at the discretion of the technician as is suitable for establishing the first plurality of light guides 400. More specifically, in at least one embodiment, light guide material 600 is provided in a hopper or reservoir 602 of an extrusion device 604, and extruded upon first clad layer 300 in the form of the first plurality of light guides 400.

In yet another embodiment, the first plurality of light guides 400 are provided by an ink-jet device, not shown. In addition, multiple systems may be combined, such as, for example, extrusion device 604 may provide a plurality of ribbons of light guide material 600 that are then shaped by embossing drum 504. Further, it is understood and appreciate that where, as in FIG. 5, light guide material 500 is deposited as a uniform layer and formed into the first plurality of light guides 400, some amount of light guide material 500 may be removed in establishing the desired geometry for the first plurality of light guides 400.

In both FIGS. 4 and 5, the first plurality of light guides 400 are illustrated as being parallel. It is understood and appreciated that articulation of the embosser 502, the extrusion device 604, the carrier 202, and/or combinations thereof, may provide a first plurality of light guides 400 that bend and/or change direction. In addition, relative motion exists between the embosser 502 and carrier 202, or the extrusion device 604 and carrier 202. Such relative motion may be achieved by moving the embosser 502 or extrusion device 604 above the carrier 202, or the carrier 202 past the embosser 502 or extrusion device 604.

Light guide material 500/600 is a transparent material with a selected index of refraction. Moreover, light guide material 500/600 may be referred to as a first transparent material provided upon the first clad layer 300. As used herein, the term "transparent" is generally defined to include the definitions of "capable of transmitting light so that objects or images can be seen as if there were no intervening material," and "easily seen through." In at least one embodiment the materials described herein as transparent may be colored. Light transmitted through an acrylic light guide attenuates at a rate of no more than a few percents per meter through internal scattering and absorption.

It is understood and appreciated that the index of refraction for the light guide material 500/600 is different from the index of refraction for the first clad layer 300. In at least one embodiment, light guide material 500/600 may be glass, plastic, polymer, acrylic or combinations thereof. In addition, in at least one embodiment, light guide material 500/600, provided to establish the first plurality of light guides 400, is selected from the group including an evaporative curable material, a photocurable material, a thermosetting material, and a thermoplastic material.

Thermoplastic materials are those that soften when heated, and harden again when cooled. Thermoplastics materials can generally undergo many melt/freeze cycles with no appreciable chemical change. Thermoplastic materials utilized as light guide material 500/600 are heated to facilitate the embossing process, as in FIG. 5, or the extrusion process as in FIG. 6. Cooled, the formed plurality of light guides 400 will retain their imparted geometry.

Thermosetting materials are polymer materials that cure, through the addition of heat, to a stronger form. More specifically, the initial state is typically a fluid or viscous state generally incapable of retaining a form, with a cured state being a hardened state generally capable of retaining a form. The energy may be provided in the form of heat, or through a chemical reaction (such as, for example, two part epoxy). In contrast to thermoplastic materials, thermosetting materials cannot be re-melted and re-molded after they are cured.

Photocurable materials are those which harden when exposed to radiation, typically ultraviolet light. Like thermosetting materials, photocurable cannot be softened again after curing. The advantage of photocurable materials is that the hardening process can take place almost instantaneously and with little heating of the material.

Figure 7:
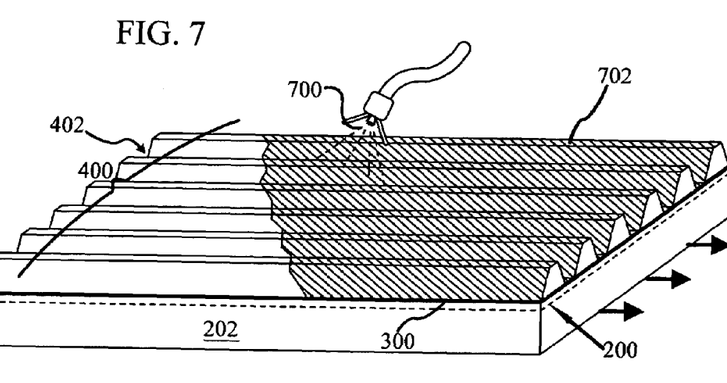
FIG. 7 illustrates the deposition of a second clad layer upon the first plurality of light guide, according to an embodiment.

Following the establishment of the first plurality of light guides 400 separated by grooves 402, a clad material 700 is applied to establish second clad layer 702 upon the first plurality of light guides 400. In at least one embodiment, second clad layer 702 is established upon both the first plurality of light guides 400 and grooves 402.

Second clad layer 702 consists of material with a selected index of refraction. Specifically, in at least one embodiment, second clad layer 702 has the same index of refraction as first clad layer 300. Moreover, second clad layer 702 is essentially the same material as first clad layer 300.

As shown in FIG. 7, in at least one embodiment, second clad layer 702 is provided by spraying. Second clad layer 702 may also be deposited by dipping or other appropriate methods, so as to provide a uniformly-thick second clad layer 702. More specifically, the uniform thickness of the second clad layer 702 is between about one and ten microns. In at least one embodiment, the thickness of second clad layer 702 is about four microns.

Figure 8:
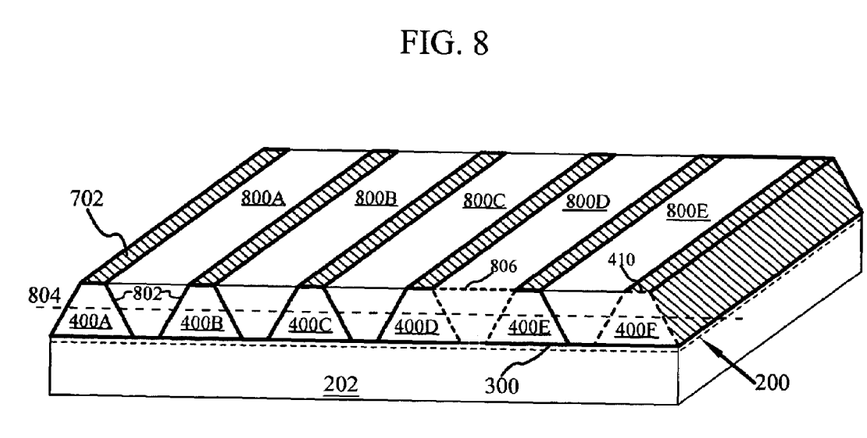
FIG. 8 illustrates a second plurality of light guides deposited between the first plurality of light guides shown in FIG. 4, according to an embodiment.

A second transparent material is now used to provide a second plurality of light guides 800 between the first plurality of light guides 400, shown as second plurality of light guides 800A~E in FIG. 8. As illustrated conceptually in FIG. 9, in at least one embodiment, the second transparent material 900 is dispensed from a hopper or reservoir 902 to fill the plurality of grooves 402. As illustrated, the dispensing process is controlled to fill the grooves 402 to the top 404 of grooves 402. The second transparent material 900 is disposed upon the second clad layer 702, now illustrated as a thick black line 802, which coats grooves 402 and is thus disposed between first plurality of light guides 400 and second plurality of light guides 800.

In at least one embodiment, second transparent material 900 used to provide the second plurality of light guides 800 may be glass, plastic, polymer, acrylic or combinations thereof. In addition, in at least one embodiment, second transparent material 900, provided to establish the second plurality of light guides 800, is selected from the group including an evaporative curable material, a photocurable material, a thermosetting material, and a thermoplastic material.

Moreover, in at least one embodiment, second transparent material 900 is a light guide material substantially identical to light guide material 500/600 providing first plurality of light guides 400. More specifically, second transparent material 900 provides second plurality of light guides 800 having substantially the same optical characteristics, for example, the same index of refraction, as the first plurality of light guides 400.

So as to facilitate the filling of grooves 402, second transparent material 900 may be applied/deposited as a viscous fluid or a malleable material. Use of a fluid as second transparent material 900 may have advantageous properties, as the material will flow into grooves 402 without requiring compression, and/or may be drawn into grooves 402 by such forces as gravity and capillary action. When applied as a fluid, second transparent material 900 is cured so as to solidify and remain as disposed.

FIG. 10 illustrates an alternative embodiment in which the second transparent material may be deposited to overfill the grooves 402 and establish over-thick transparent layer 1000. This over-thick transparent layer 1000 is planarized to form the second plurality of light guides 800 between the first plurality of light guides 400. In at least one embodiment, the planarization is accomplished via a chemical mechanical polishing (CMP) process. In a typical CMP process, the over-thick transparent layer 1000 is exposed to an abrasive medium under controlled chemical, pressure, velocity and temperature conditions. Abrasive media include slurry solutions and polishing pads.

As the planarizing process is performed, the height of the over-thick transparent layer is reduced. The thickness is reduced until the second clad layer 702 on the upper most portion of the first plurality of light guides 400 is exposed, thus providing a developing ribbon as is conceptually illustrated in FIG. 8.

With respect to FIG. 8, it may be appreciated that the provided second plurality of light guides 800 have a second geometry, illustrated by dotted line 806. As illustrated, in at least one embodiment, the second geometry 806 is selected to mate with the first geometry 410 of the first plurality of light guides 400. In at least one embodiment, the second geometry 806 is an inversion of the first geometry 410. As shown, the cross section of this second geometry 806 is an isosceles trapezoid. Moreover, the isosceles trapezoid represented by the second geometry 806 is substantially the same as the isosceles trapezoid of the first geometry 410, the second geometry 806 having been mirrored along the line 804 to accomplish mating the geometries.

Following the establishment of the second plurality of light guides 800 between the first plurality of light guides 400, a clad material 1100 is applied to establish third clad layer 1102 upon the second plurality of light guides 800. In at least one embodiment, third clad layer 1102 is established upon the second plurality of light guides 800 and any exposed portions of the first plurality of light guides 400 and/or exposed portions of the second clad layer 702.

Third clad layer 1102 consists of material with a selected index of refraction. Specifically, in at least one embodiment, third clad layer 1102 has substantially the same index of refraction as first clad layer 300 and second clad layer 702. Moreover, third clad layer 1102 is essentially the same material as first clad layer 300 and second clad layer 702.

As shown in FIG. 11, in at least one embodiment, third clad layer 1102 is provided by spraying. Third clad layer 1102 may also be deposited by dipping or other appropriate methods, so as to provide a uniformly-thick third clad layer 1102. More specifically, the uniform thickness of the third clad layer 1102 is between about one and ten microns. In at least one embodiment, the thickness of third clad layer 1102 is about four microns.

Third clad layer 1102 completes the formation of densely packed light guide ribbon 1104. More specifically, the first clad layer 300, second clad layer 702 and third clad layer 1102 collectively provide circumferential cladding for light guide cores provided in the first plurality of light guides 400 and second plurality of light guides 800. In other words, each member of the first plurality and second plurality of light guides 400, 800 is a light guide core, circumferentially cladded by combined portions of first, second and third clad layers 300, 702, 1102.

As stated, in at least one embodiment, the first plurality of light guides 400 and second plurality of light guides 800 may be described as having substantially the same first index of refraction. The first, second and third clad layers 300, 702, 1102 have substantially the same second index of refraction. As the second index of refraction is less than the first index of refraction, the cladded light guides 400, 800 will transmit light through total internal reflection, or TIR. TIR is the reflection of all incident light off a boundary. TIR only occurs when a light ray is both in a medium with a higher index of refraction and approaching a medium with a lower index of refraction, and the angle of incidence for the light ray is greater than the "critical angle."

The critical angle is defined as the angle of incidence measured with respect to a line normal to the boundary between the two optical media for which light is refracted at an exit angle of 90 degrees—that is, the light propagates along the boundary—when the light impinges on the boundary from the side of the medium of higher index of refraction. For any angle of incidence greater than the critical angle, the light traveling through the medium with the higher index of refraction will undergo total internal refraction. The value of the critical angle depends upon the combination of materials present on each side of the boundary.

Where release layer 200 has been provided between the carrier 202 and first clad layer 300, the release layer 200 permits removal of the densely packed light guide ribbon 1104 from the carrier 202. FIG. 12 conceptually illustrates a portion of a densely packed light guide ribbon 1104 that has been released from the carrier 202. As such, the properties of densely packed light guide ribbon 1104 may be more fully appreciated.

Activation of the release property of the release layer 200 may be accomplished by a variety of different methods dependent upon the type of release layer 200 employed. For example, where an ultraviolet release layer is utilized, ultraviolet light shined through carrier 202 will permit separation of densely packed light guide ribbon 1104 from carrier 202. Where ultraviolet curable materials are utilized for the first and second plurality of light guides 400, 800, a heat activated release layer 200 or release layer 200 with low tensile strength adhesive may be used.

Specifically, densely packed light guide ribbon 1104 released from the carrier 202 includes a first clad layer 300, illustrated as a thick black line. A first plurality of light guides 400A~F are disposed upon the first clad layer 300, each light guide 400 having a first geometry 410. A second plurality of light guides 800A~E have a second geometry 806 configured to mate with the first geometry 410. A second clad layer 702 (illustrated as a thick black line) is disposed between the mating first plurality and second plurality of light guides 400, 800. A third clad layer 1102 is disposed upon the mated first and second light guides 400, 800, opposite from the first clad layer 300.

As illustrated, in at least one embodiment, the first and second pluralities of light guides 400, 800 are parallel. Further, where appropriately flexible light guide materials have been employed to provide the first plurality and second plurality of light guides 400, 800, the densely packed light guide ribbon 1104 is also flexible.

As the thickness of the layer established by the first plurality of light guides 400 is typically between about fifty and 100 microns, the mated second plurality of light guides 800 provides a densely packed light guide ribbon 1104 with a thickness that is also about fifty to one hundred microns. As each first, second and third clad layer 300, 702, 1102 is typically between about one and ten micros, despite the exaggeration for ease of illustration, it is easily appreciated that the first and second plurality of light guides 400, 800 account for about one hundred percent (100%) of the material comprising the densely packed light guide ribbon 1104.

Moreover, whereas traditional optical fibers are round or elliptical, when placed side by side in a ribbon, the circular configuration mandates that they touch at a point, but no more than a point. As such there is likely to be substantial fill material or empty space in the areas between the points of contact. In contrast, the light guides 400, 800 of the densely packed light guide ribbon 1104 are not round or elliptical.

More specifically, the geometric shapes of the light guides 400, 800 are such that significant portions of their circumferential cladding are commonly shared. As illustrated intervening space between the light guides 400, 800 is minimal, if not altogether non-existent. In other words, whereas two circular/elliptical light guides might share a common side point, two non-circular/elliptical light guides 400, 800 of densely packed light guide ribbon 1104 share a common side wall.

Changes may be made in the above methods, systems and structures without departing from the scope thereof. It should thus be noted that the matter contained in the above description and/or shown in the accompanying drawings should be interpreted as illustrative and not in a limiting sense. The following claims are intended to cover all generic and specific features described herein, as well as all statements of the scope of the present method, system and structure, which, as a matter of language, might be said to fall therebetween.

What is claimed is:

1. A method of making densely packed light guide ribbons comprising:
   depositing a first clad layer upon a carrier;
   providing a first plurality of spaced light guides upon the first clad layer, each light guide of the first plurality having a first geometry;
   depositing a second clad layer upon the first plurality of spaced light guides;
   providing a second plurality of light guides between the first plurality of spaced light guides, each light guide of the second plurality having a second geometry, the second geometry mating with the first geometry; and
   depositing a third clad layer upon the second plurality of light guides to form a densely packed light guide ribbon.

2. The method of claim 1, wherein the first plurality of spaced light guides are uniformly spaced.

3. The method of claim 1, wherein the first plurality of spaced light guides are provided by an extrusion device.

4. The method of claim 1, wherein the first plurality of spaced light guides are provided by an embosser.

5. The method of claim 1, wherein the first plurality of spaced light guides are provided by an ink-jet device.

6. The method of claim 1, further including applying a release layer to the carrier, the first clad layer deposited upon the release layer, the release layer permitting removal of the densely packed light guide ribbon from the carrier.

7. The method of claim 1, wherein the first and second pluralities of light guides comprise material selected from the group of an evaporative curable material, a photocurable material, a thermoset material, and a thermoplastic material.

8. The method of claim 1, wherein the second plurality of light guides are provided by depositing a fluid light guide material in the spaces between the first plurality of light guides, the fluid light guide material being cured to solidify.

9. The method of claim 1, wherein the first and second plurality of light guides comprise a polymer.

10. The method of claim 1, wherein the first and second plurality of light guides comprise acrylic.

11. The method of claim 1, wherein the clad layers are applied by dipping.

12. The method of claim 1, wherein the clad layers are applied by spraying.

13. The method of claim 1, wherein the first and second plurality of light guides are parallel.

14. The method of claim 1, wherein the densely packed light guide ribbon is flexible.

15. The method of claim 1, wherein the first plurality of light guides and the second plurality of light guides have a first index of refraction, the first clad layer, second clad layer and third clad layer having a second index of refraction.

16. The method of claim 1, wherein the first plurality of light guides and the second plurality of light guides account for about 100% of the material comprising the densely packed light guide ribbon.

17. A method of making densely packed light guide ribbons comprising:
    depositing a first clad layer upon a carrier;
    depositing light guide material upon the first clad layer;
    processing the light guide material to form a first plurality of light guides separated by grooves, each groove having a top and a bottom;
    depositing a second clad layer upon the first plurality of light guides;
    filling the grooves with light guide material to provide a second plurality of light guides; and
    applying a third clad layer upon the second plurality of light guides to form a densely packed light guide ribbon.

18. The method of claim 17, further comprising planarizing the grooves filled with light guide material to the top of the grooves.

19. The method of claim 17, wherein each groove comprises a top and a bottom, the bottom narrower then the top.

20. The method of claim 17, wherein the first and second pluralities of light guides comprise material selected from the group consisting essentially of an evaporative curable material, a photocurable material, a thermoset material, and a thermoplastic material.

21. The method of claim 17, wherein each light guide of the first plurality has a first geometry and each light guide of the second plurality has a second geometry, the second geometry mating with the first geometry.

22. The method of claim 17, further comprising applying a release layer to the carrier, the first clad layer deposited upon the release layer, the release layer permitting removal of the densely packed light guide ribbon from the carrier.

23. A method of making densely packed light guide ribbons for a light guide screen, comprising:
    applying a release layer to a carrier;
    depositing a first clad layer upon the release layer;
    providing a first transparent material upon the first clad layer, the first transparent material having a first selected index of refraction, the first clad layer having a second selected index of refraction;
    establishing a plurality of grooves in the first transparent material, each groove having a top and a bottom, the bottom narrower then the top;
    coating the plurality of grooves and remaining first transparent material with a second clad layer, the second clad layer having an index of refraction substantially identical to the index of refraction of the first clad layer;
    filling the plurality of grooves with a second transparent material having an index of refraction substantially identical to the first index of refraction of the first transparent material; and
    applying a third clad layer to the filled grooves to form a densely packed light guide ribbon, the third clad layer having an index of refraction substantially identical to the index of refraction of the first clad layer.

24. The method of claim 23, wherein the first and second transparent materials comprise material selected from the group consisting essentially of an evaporative curable material, a photocurable material, a thermoset material, and a thermoplastic material.

25. The method of claim 23, wherein the first and second transparent materials account for about 100% of the material comprising the densely packed light guide ribbon.

* * * * *